W. B. LEONARD.
AMUSEMENT DEVICE.
APPLICATION FILED FEB. 8, 1908.

900,749.

Patented Oct. 13, 1908.

2 SHEETS—SHEET 1.

Witnesses
Frank A. Fahl
Thomas M. Means

Inventor
William B. Leonard,
By Bradford Hood
Attorneys

W. B. LEONARD.
AMUSEMENT DEVICE.
APPLICATION FILED FEB. 8, 1908.

900,749.

Patented Oct. 13, 1908.

2 SHEETS—SHEET 2.

Witnesses
Frank A. Fahl
Thomas W. McMeans

Inventor
William B. Leonard
By Bradford Wood
Attorneys

UNITED STATES PATENT OFFICE.

WILLIAM B. LEONARD, OF CHICAGO, ILLINOIS.

AMUSEMENT DEVICE.

No. 900,749.  Specification of Letters Patent.  Patented Oct. 13, 1908.

Application filed February 8, 1908. Serial No. 414,882.

*To all whom it may concern:*

Be it known that I, WILLIAM B. LEONARD, a citizen of the United States, residing at Chicago, in the county of Cook and State of Illinois, have invented certain new and useful Improvements in Amusement Devices, of which the following is a specification.

The object of my invention is to produce an improved form of carrier especially adapted for use as an amusement apparatus.

The accompanying drawings illustrate my invention.

Figure 1:
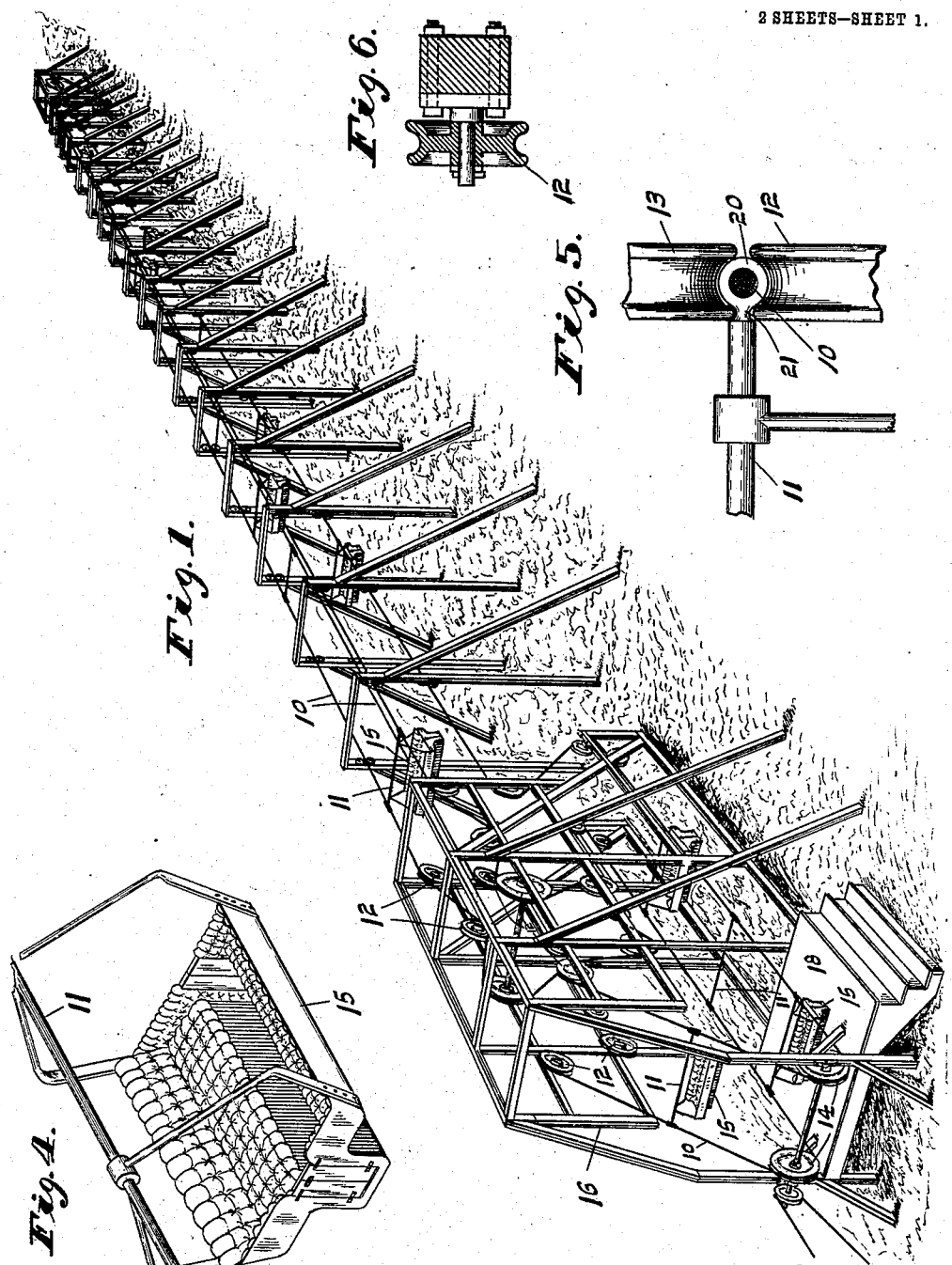
Figure 2:
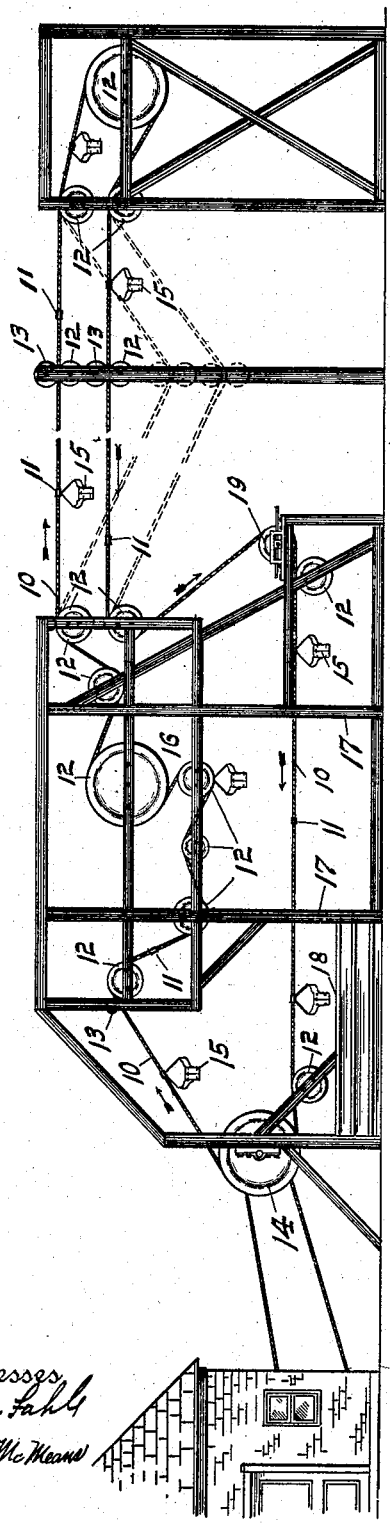
Figure 3:
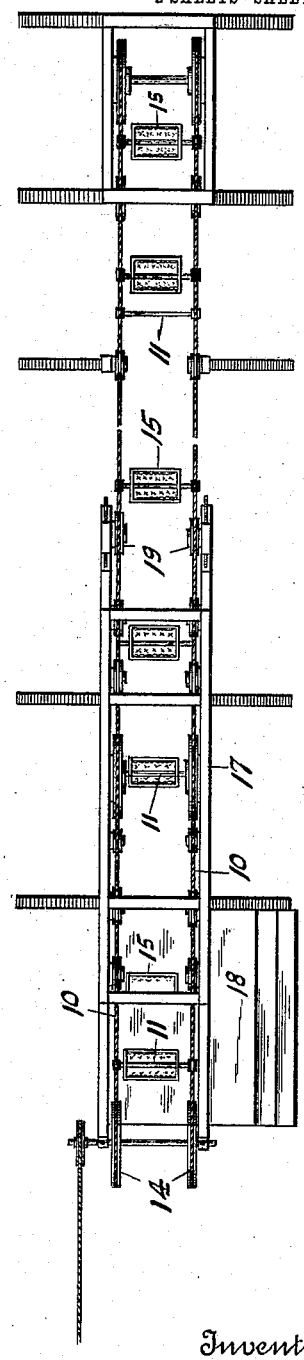

Figure 1 is a perspective view of an apparatus embodying my invention; Fig. 2, a side elevation; Fig. 3 a plan; Fig. 4 a perspective view of a suitable carrier for passengers; Fig. 5 a detail showing an approved form of connection between the cables and cross-bars, and Fig. 6 a detail of one of the cable-supporting idlers.

In the drawings, 10, 10 indicate a pair of endless cables united into an endless carrier by cross-bars 11. The cables 10 are supported or passed partially around a plurality of pulleys or guide wheels 12 which should be arranged at different levels so as to produce a sufficient number of "ups and downs" to satisfy requirements. Each of the wheels 12 is preferably grooved to receive its cable and where necessary to insure against accident, the wheels 12 may be guarded by guard wheels 13 which are also grooved. Cables 10 are also passed over driving wheels 14 which may be driven in any suitable manner. Some of the larger wheels 12 *i. e.*, those which have a radius somewhat greater than the depending dimension of the passenger car, may be connected in pairs by a shaft to which they are keyed thus facilitating the maintenance of the two cables in the proper relation.

Pivotally swung upon some of the cross-bars 11 are suitable passenger cars 15 and, in order that sharp turns and reverses may be made, as shown at 16, I prefer to use, in most cases, comparatively small supporting wheels 12 but in order to do this and at the same time not interfere with the proper continuous depending of the cars the wheels 12 at opposite sides of the system should be separately supported.

A home-station structure 17 may be provided with a landing platform 18. From this station the carrier may easily be extended to any length either straight-away, as shown, or through other structures like station 17. Suitable adjustable wheels 19 may be provided to take up an unnecessary slack in the cables.

Where grooved supporting wheels are used as shown it is desirable that the cross-bars 11 be so connected to the cables as to run over them as smoothly and with as little danger as possible. For this purpose I provide the ends of the cross-bars with cable-receiving eyes 20 having small necks 21 which may pass readily over or between the flanges of the wheels.

I make a part or all of the guide wheels 12 and guard wheels 13 adjustable, as illustrated by the dotted lines on Fig. 2. This enables me to vary the course of the travel of the cars from time to time, as I may wish. It is easy to thus give the apparatus a different course at different periods of its use— such as a straight course one week, a serpentine course the next week, and a course partly straight and partly serpentine a following week. The variations will be understood to be entirely within the control of the operator.

I claim as my invention:

1. In an apparatus of the class described, the combination of an endless carrier, suitable supports therefor, means by which the carrier may be driven, a plurality of cars pivotally suspended from said carrier, and means for adjusting said supports and thus varying the course of said endless carrier.

2. In an apparatus of the class described, the combination of a pair of parallel endless members, cross-bars connecting said members, cars pivotally depending from said cross-bars, two series of supports for said endless members between which the cars may pass, and means for adjusting said supports and thus varying the course of said endless carrier.

In witness whereof, I have hereunto set my hand and seal at Chicago, Illinois, this thirtieth day of January, A. D. one thousand nine hundred and eight.

WILLIAM B. LEONARD. [L. S.]

Witnesses:
 MOSES W. LITTLEFIELD,
 CLIFTON A. SAWYER.